US006570998B1

(12) United States Patent
Ohtsuka et al.

(10) Patent No.: US 6,570,998 B1
(45) Date of Patent: May 27, 2003

(54) VEHICLE AREA DETECTING APPARATUS AND VEHICLE AREA DETERMINING METHOD

(75) Inventors: Kazuyoshi Ohtsuka, Tokyo (JP); Sholin Kyo, Tokyo (JP)

(73) Assignee: Honda Elesys Co. Ltd. (JP)

( * ) Notice: Subject to any disclaimer, the term of this patent is extended or adjusted under 35 U.S.C. 154(b) by 0 days.

(21) Appl. No.: 09/357,554

(22) Filed: Jul. 20, 1999

(30) Foreign Application Priority Data

Jul. 22, 1998  (JP) .......................................... 10-206693

(51) Int. Cl.$^7$ ................................................ G06K 9/00
(52) U.S. Cl. ........................ 382/104; 340/907; 348/113
(58) Field of Search .......................... 382/104; 340/907, 340/930; 348/113

(56) References Cited

U.S. PATENT DOCUMENTS

| | | | |
|---|---|---|---|
| 5,487,116 A | | 1/1996 | Nakano et al. |
| 5,555,312 A | * | 9/1996 | Shima et al. ................ 382/104 |
| 5,790,403 A | | 8/1998 | Nakayama |

FOREIGN PATENT DOCUMENTS

| | | |
|---|---|---|
| JP | 4-278683 | 10/1992 |
| JP | 6-89339 | 3/1994 |
| JP | 6-331335 | 12/1994 |
| JP | 8-30770 | 2/1996 |
| JP | 10-171966 | 6/1998 |
| JP | 11-14348 | 1/1999 |

OTHER PUBLICATIONS

M. Schwarzinger et al. "Vision–Based Car–Followiing: Detection, Tracking and Identification" IEEE Symposium on Intelligent Vehicles, Detroit, 1992.

F. Thomenek et al. "Multiple Object Recognittion and Scene Interpretation for Autonomos Road Vehicle Guidance" IEEE Symposium on Intelligent Vehicles, Paris, 1994.

Bernasch J.; Kounty R. "Stabile Objektverfolgung und Detektion von nicht–vorhersagbarem Verhalten in komplexen Bildfolgen" Mustererkennung 1993, 15. DAGM–Symposium, Lubeck, Springer Verlag, Seiten 19–26.

Th. Kalinke, W. von Seelen "A Neural Network for Symmetryu–Based Object Detection and Tracking" Mustererkennung 1996, 18. DAGM–Symposium, Heidelberg, Springer–Verlag, Seiten 37–44.

* cited by examiner

*Primary Examiner*—Jayanti K. Patel
*Assistant Examiner*—Barry Choobin
(74) *Attorney, Agent, or Firm*—Hayes Soloway P.C.

(57) ABSTRACT

A vehicle area detector correctly detects a vehicle area. The vehicle area detector detects a vehicle area in a vehicle candidate area having a high probability of existence of a vehicle in an image produced by imaging means mounted on a vehicle. For the correct detection of the vehicle area, the detector includes a horizontal symmetry evaluator to evaluate a degree of horizontal symmetry with respect to a degree of gradation in the image of the area, a variance evaluator to evaluate a degree of variance in the degree of gradation in the image of the area, a lower-area mean gradation evaluator to evaluate a difference in the degree of gradation of an image between a lower area of a vehicle candidate area and an area in the proximity of a lower edge of the candidate area exceeds a predetermined threshold value, and an area determining unit to determine a vehicle candidate area as the vehicle area in accordance with results of evaluation from the symmetry evaluator, the variance evaluator, and the lower-are mean gradation evaluator.

9 Claims, 7 Drawing Sheets

FIG. 5A
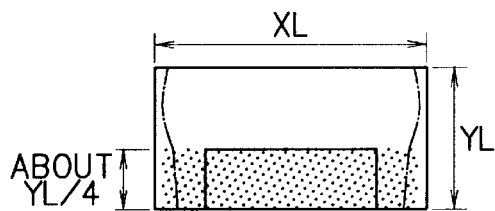
METHOD USING MEAN VALUE OF GRADATION OF OVERALL AREA (ABOUT 1/4 OF THE LOWER AREA OF CANDIDATE AREA)
FIG. 5B
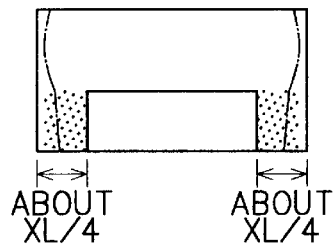
METHOD USING MEAN VALUE OF AREAS CORRESPONDING TO TIRE SHADOWS
FIG. 5C    FIG. 5D    FIG. 5E
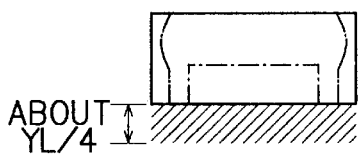 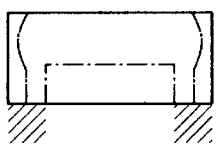 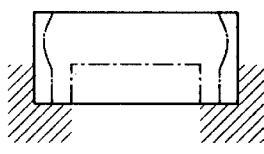
METHOD OF SELECTING REFERENCE ROAD AREA

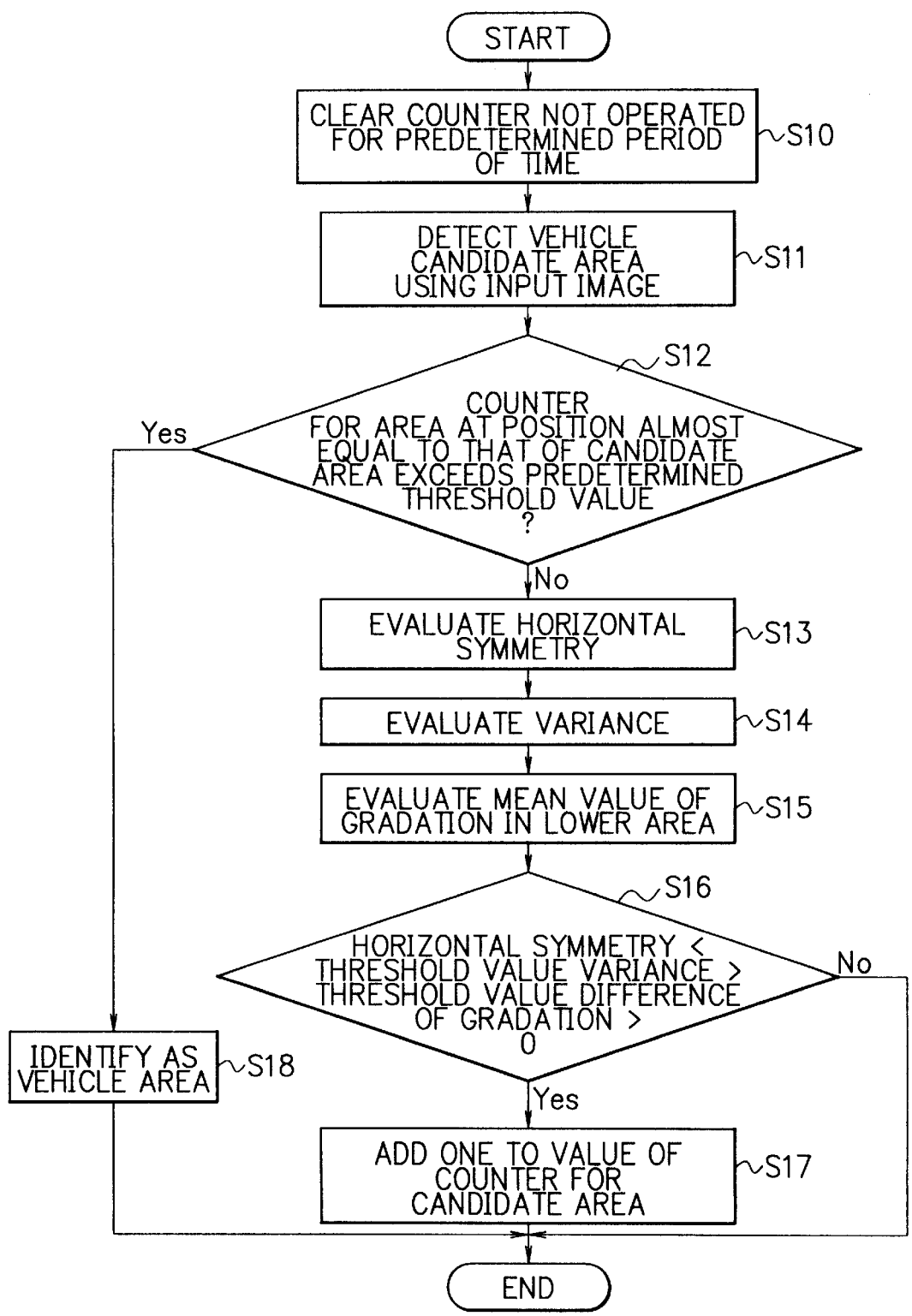

VEHICLE AREA DETECTING APPARATUS AND VEHICLE AREA DETERMINING METHOD

BACKGROUND OF THE INVENTION

The present invention relates to a vehicle area detecting apparatus and a vehicle area determining method for detecting an area of a vehicle in accordance with an image from a charge coupled device (CCD) installed in a vehicle.

DESCRIPTION OF THE PRIOR ART

Various methods have been proposed to detect an area of a vehicle in accordance with an image of the vehicle obtained by an imaging device such as a CCD camera mounted on a vehicle such as a car.

An area of a vehicle has been commonly determined, for example, as follows.

(1) For differentiated images, i.e., edge images of an image in front of a vehicle, there are conducted such operations as binarization, labeling, feature extraction, and pattern template matching.

(2) A particular zone of the overall front image is assumed as a road surface. A degree of gradation of the road surface is compared with that of an image of a zone in which the vehicle is brought into contact with the road surface.

However, the template matching in the former method (1) is attended with a problem. Namely, the target items have various contours and the obtained images vary depending on weather conditions as well as environmental conditions, for example, an image produced in the daytime is different from that attained in the nighttime. This makes it difficult to produce a template generally applicable to various cases. With the existing templates, it is consequently difficult to appropriately determine a vehicle area by the template matching. The latter method (2) using the comparison of the degree of gradation of the road surface is also attended with a problem. Due to various shadows on the road surface, the overall road surface is not uniform and hence the degree of gradation cannot be easily determined for the overall road surface. Even when a zone of the road surface is used to obtain a mean value of degree of gradation for the degree of gradation of the overall road surface, it can be considered that the obtained degree of gradation is different from that of the road surface in the vicinity of a vehicle candidate area as a target. Consequently, it is difficult to appropriately determine the vehicle area.

SUMMARY OF THE INVENTION

It is therefore an object of the present invention to provide a vehicle area detecting apparatus and a vehicle area determining method capable of more correctly identifying a vehicle area in a simple procedure.

In accordance with the present invention, there is provided a vehicle area detecting apparatus comprising imaging means mounted on a vehicle for producing an image of an object and vehicle area detecting means mounted on the vehicle for detecting a vehicle area including a vehicle in the image produced by the imaging means. The vehicle area detecting means detects the vehicle area when the vehicle area includes an image for which either one of the conditions of a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area exceeds a predetermined threshold value.

In accordance with the present invention, there is provided a vehicle area detecting apparatus comprising imaging means mounted on a vehicle for producing an image of an object and vehicle area detecting means mounted on the vehicle for detecting a vehicle area including a vehicle in the image produced by the imaging means. The vehicle area detecting means detects the vehicle area when the vehicle area includes an image for which two of the conditions of a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area exceed respective predetermined threshold values.

In accordance with the present invention, there is provided a vehicle area detecting apparatus comprising imaging means mounted on a vehicle for producing an image of an object and vehicle area detecting means mounted on the vehicle for detecting a vehicle area including a vehicle in the image produced by the imaging means. The vehicle area detecting means detects the vehicle area when the vehicle area includes an image for which a degree of horizontal symmetry with respect to a degree of gradation in the image of the area is larger than a predetermined threshold value, a degree of variance in the degree of gradation in the image of the area is larger than a predetermined threshold value, and a difference in the degree of gradation of an image between a lower area of a vehicle candidate area and an area in the proximity of a lower edge of the candidate area is larger than a predetermined threshold value.

In accordance with the present invention, there is provided a vehicle area detecting apparatus comprising imaging means mounted on a vehicle for producing an image of an object and vehicle area detecting means mounted on the vehicle for detecting a vehicle area including a vehicle in the image produced by the imaging means. The vehicle area detecting means detects the vehicle area as an area at a position substantially equal to that of the vehicle area when the area satisfies up to this point a predetermined number of times either one of a condition for a degree of horizontal symmetry with respect to a degree of gradation in the image of the area, a condition for a degree of variance in the degree of gradation in the image of the area, and a condition for a difference in the degree of gradation of an image between a lower area of a vehicle candidate area and an area in the proximity of a lower edge of the candidate area.

In accordance with the present invention, there is provided a vehicle area detecting apparatus comprising imaging means mounted on a vehicle for producing an image of an object and vehicle area detecting means mounted on the vehicle for detecting a vehicle area including a vehicle in the image produced by the imaging means. The vehicle area detecting means detects the vehicle area as an area at a position substantially equal to that of the vehicle area when the area satisfies up to this point a predetermined number of times two of the conditions for a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area.

In accordance with the present invention, there is provided a vehicle area detecting apparatus comprising imaging means mounted on a vehicle for producing an image of an object; and vehicle area detecting means mounted on the vehicle for detecting a vehicle area including a vehicle in the image produced by the imaging means. The vehicle area detecting means detects the vehicle area as an area at a position substantially equal to that of the vehicle area when the area satisfies up to this point a predetermined number of times the conditions for a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area.

In accordance with the present invention, there is provided a vehicle area detecting apparatus for detecting a vehicle area in a vehicle candidate area having a high probability of existence of a vehicle in an image produced by imaging means mounted on a vehicle. The apparatus includes horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area, and area determining means for determining a vehicle candidate area as the vehicle area when either one of results of evaluation from the symmetry evaluating means, the variance evaluating means, and the mean gradation evaluating means exceeds a predetermined threshold value.

In accordance with the present invention, there is provided a vehicle area detecting apparatus for detecting a vehicle area in a vehicle candidate area having a probability of existence of a vehicle in an image produced by imaging means mounted on a vehicle comprising horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area and area determining means for determining a vehicle candidate area as the vehicle area when two of the results of evaluation from the symmetry evaluating means, the variance evaluating means, and the mean gradation evaluating means exceed respective predetermined threshold values.

In accordance with the present invention, there is provided a vehicle area detecting apparatus for detecting a vehicle area in a vehicle candidate area having a probability of existence of a vehicle in an image produced by imaging means mounted on a vehicle comprising horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area and area determining means for determining a vehicle candidate area as the vehicle area when the results of evaluation from the symmetry evaluating means, the variance evaluating means, and the mean gradation evaluating means exceed respective predetermined threshold values.

In accordance with the present invention, there is provided a vehicle area detecting apparatus for detecting a vehicle area in a vehicle candidate area having a high probability of existence of a vehicle in an image produced by imaging means mounted on a vehicle. The apparatus includes horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area, area determining means for determining a vehicle candidate area as the vehicle area when either one of the results of evaluation from the symmetry evaluating means, the variance evaluating means, and the mean gradation evaluating means exceeds a predetermined threshold value and area evaluating means for detecting a vehicle candidate area at a position substantially equal to that of a vehicle candidate area as the vehicle area when an event in which either one of the results of evaluation from the symmetry evaluating means, the variance evaluating means, and the mean gradation evaluating means exceeds a predetermined threshold value is detected up to this point a predetermined number of times for the vehicle candidate area by the area determining means.

In accordance with the present invention, there is provided a vehicle area detecting apparatus for detecting a vehicle area in a vehicle candidate area having a high probability of existence of a vehicle in an image produced by imaging means mounted on a vehicle. The apparatus includes horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area, area determining means for determining a vehicle candidate area as the vehicle area when two of the results of evaluation from the symmetry evaluating means, the variance evaluating means, and the mean gradation evaluating means exceed respective predetermined threshold values, and area determining means for detecting a vehicle candidate area at a position substantially equal to that of a vehicle candidate area as the vehicle area when an event in which two of the results of evaluation from the symmetry evaluating means, the variance evaluating means, and the mean gradation evaluating means exceed respective predetermined threshold values is detected up to this point a predetermined number of times for the vehicle candidate area by the area determining means.

In accordance with the present invention, there is provided a vehicle area detecting apparatus for detecting a vehicle area in a vehicle candidate area having a high probability of existence of a vehicle in an image produced by imaging means mounted on a vehicle. The apparatus includes horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area, area determining means for determining a vehicle candidate area as the vehicle area when the results of evaluation from the symmetry evaluating means, the variance evaluating means, and the mean gradation evaluating means exceed respective predetermined threshold values, and area determining means for detecting a vehicle candidate area at a position substantially equal to that of a vehicle candidate area as the vehicle area when an event in which the results of evaluation from the symmetry evaluating means, the variance evaluating means, and the mean gradation evaluating means exceed respective predetermined threshold values is detected up to this point a predetermined number of times for the vehicle candidate area by the area determining means.

In accordance with the present invention, there is provided a vehicle area detecting method, comprising the steps of imaging an image of an object and detecting a vehicle area including a vehicle in the image produced by the imaging step. The vehicle area detecting step includes the step of detecting the vehicle area when the vehicle area includes an image for which either one of the conditions of a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area exceeds a predetermined threshold value.

In accordance with the present invention, there is provided a vehicle area detecting method, comprising the steps of imaging an image of an object and detecting a vehicle area including a vehicle in the image produced by the imaging step. The vehicle area detecting step includes the step of detecting the vehicle area when the vehicle area includes an image for which two of the conditions of a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area exceed respective predetermined threshold values.

In accordance with the present invention, there is provided a vehicle area detecting method, comprising the steps of imaging an image of an object and detecting a vehicle area including a vehicle in the image produced by the imaging step. The vehicle area detecting step includes the step of detecting the vehicle area when the vehicle area includes an image for which a degree of horizontal symmetry with respect to a degree of gradation in the image of the area is larger than a predetermined threshold value, a degree of variance in the degree of gradation in the image of the area is larger than a predetermined threshold value, and a difference in the degree of gradation of an image between a lower area of a vehicle candidate area and an area in the proximity of a lower edge of the candidate area is larger than a predetermined threshold value.

In accordance with the present invention, there is provided a vehicle area detecting method, comprising the steps of imaging an image of an object and detecting a vehicle area including a vehicle in the image produced by the imaging step. The vehicle area detecting step includes the step of detecting the vehicle area as an area at a position substantially equal to that of the vehicle area when the area satisfies up to this point a predetermined number of times either one of a condition for a degree of horizontal symmetry with respect to a degree of gradation in the image of the area, a condition for a degree of variance in the degree of gradation in the image of the area, and a condition for a difference in the degree of gradation of an image between a lower area of a vehicle candidate area and an area in the proximity of a lower edge of the candidate area.

In accordance with the present invention, there is provided a vehicle area detecting method, comprising the steps of imaging an image of an object and detecting a vehicle area including a vehicle in the image produced by the imaging step. The vehicle area detecting step includes the step of detecting the vehicle area as an area at a position substantially equal to that of the vehicle area when the area satisfies up to this point a predetermined number of times two of the conditions of a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area.

In accordance with the present invention, there is provided a vehicle area detecting method, comprising the steps of imaging an image of an object and detecting a vehicle area including a vehicle in the image produced by the imaging means. The vehicle area detecting step includes the step of detecting the vehicle area as an area at a position substantially equal to that of the vehicle area when the area satisfies up to this point a predetermined number of times the conditions for a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area.

In accordance with the present invention, there is provided a vehicle area detecting method of detecting a vehicle area in a vehicle candidate area having a high probability of existence of a vehicle in an image produced by imaging means mounted on a vehicle. The method includes a horizontal symmetry evaluating step of evaluating a degree of horizontal symmetry with respect to a degree of gradation in the image of the area, a variance evaluating step of evaluating a degree of variance in the degree of gradation in the image of the area, a mean gradation evaluating step of evaluating a difference in the degree of gradation of an image between a lower area of a vehicle candidate area and an area in the proximity of a lower edge of the candidate area, and an area determining step of determining a vehicle candidate area as the vehicle area when either one of the results of evaluation from the symmetry evaluating step, the variance evaluating step, and the mean gradation evaluating step exceeds a predetermined threshold value.

In accordance with the present invention, there is provided a vehicle area detecting method of detecting a vehicle area in a vehicle candidate area having a high probability of existence of a vehicle in an image produced by imaging means mounted on a vehicle. The method includes a horizontal symmetry evaluating step of evaluating a degree of horizontal symmetry with respect to a degree of gradation in the image of the area, a variance evaluating step of evaluating a degree of variance in the degree of gradation in the image of the area, a mean gradation evaluating step of evaluating a difference in the degree of gradation of an image between a lower area of a vehicle candidate area and an area in the proximity of a lower edge of the candidate area and an area determining step of determining a vehicle candidate area as the vehicle area when two of the results of evaluation from the symmetry evaluating step, the variance evaluating step, and the mean gradation evaluating step exceed respective predetermined threshold values.

In accordance with the present invention, there is provided a vehicle area detecting method of detecting a vehicle area in a vehicle candidate area having a high probability of existence of a vehicle in an image produced by imaging means mounted on a vehicle. The method includes a horizontal symmetry evaluating step of evaluating a degree of horizontal symmetry with respect to a degree of gradation in the image of the area, a variance evaluating step of evaluating a degree of variance in the degree of gradation in the image of the area, a mean gradation evaluating step of evaluating a difference in the degree of gradation of an image between a lower area of a vehicle candidate area and an area in the proximity of a lower edge of the candidate area and an area determining step of determining a vehicle candidate area as the vehicle area when the results of evaluation from the symmetry evaluating step, the variance evaluating step, and the mean gradation evaluating step exceed respective predetermined threshold values.

In accordance with the present invention, there is provided a vehicle area detecting method of detecting a vehicle area in a vehicle candidate area having a high probability of existence of a vehicle in an image produced by imaging means mounted on a vehicle. The method includes a horizontal symmetry evaluating step of evaluating a degree of horizontal symmetry with respect to a degree of gradation in the image of the area, a variance evaluating step of evaluating a degree of variance in the degree of gradation in the image of the area, a mean gradation evaluating step of evaluating a difference in the degree of gradation of an image between a lower area of a vehicle candidate area and an area in the proximity of a lower edge of the candidate area, an area determining step of determining a vehicle candidate area as the vehicle area when either one of the results of evaluation from the symmetry evaluating step, the variance evaluating step, and the mean gradation evaluating step exceeds a predetermined threshold value, and an area evaluating step for detecting a vehicle candidate area at a position substantially equal to that of a vehicle candidate area as the vehicle area when an event in which either one of the results of evaluation from the symmetry evaluating step, the variance evaluating step, and the mean gradation evaluating step exceeds a predetermined threshold value is detected up to this point a predetermined number of times for the vehicle candidate area by the area determining step.

In accordance with the present invention, there is provided a vehicle area detecting method of detecting a vehicle area in a vehicle candidate area having a high probability of existence of a vehicle in an image produced by imaging means mounted on a vehicle. The method includes a horizontal symmetry evaluating step of evaluating a degree of horizontal symmetry with respect to a degree of gradation in the image of the area, a variance evaluating step of evaluating a degree of variance in the degree of gradation in the image of the area, a mean gradation evaluating step of evaluating a difference in the degree of gradation of an image between a lower area of a vehicle candidate area and an area in the proximity of a lower edge of the candidate area, an area determining step of determining a vehicle candidate area as the vehicle area when two of the results of evaluation from the symmetry evaluating step, the variance evaluating step, and the mean gradation evaluating step exceed respective predetermined threshold values, and an area evaluating step for detecting a vehicle candidate area at a position substantially equal to that of a vehicle candidate area as the vehicle area when an event in which two of the results of evaluation from the symmetry evaluating step, the variance evaluating step, and the mean gradation evaluating step exceed respective predetermined threshold values is detected up to this point a predetermined number of times for the vehicle candidate area by the area determining means.

In accordance with the present invention, there is provided a vehicle area detecting method of detecting a vehicle area in a vehicle candidate area having a high probability of existence of a vehicle in an image produced by imaging means mounted on a vehicle. The method includes a horizontal symmetry evaluating step of evaluating a degree of horizontal symmetry with respect to a degree of gradation in the image of the area, a variance evaluating step of evaluating a degree of variance in the degree of gradation in the image of the area, a mean gradation evaluating step of evaluating a difference in the degree of gradation of an image between a lower area of a vehicle candidate area and an area in the proximity of a lower edge of the candidate area, an area determining step of determining a vehicle candidate area as the vehicle area when the results of evaluation from the symmetry evaluating step, the variance evaluating step, and the mean gradation evaluating step exceed respective predetermined threshold values, and an area evaluating step for detecting a vehicle candidate area at a position substantially equal to that of a vehicle candidate area as the vehicle area when an event in which the results of evaluation from the symmetry evaluating step, the variance evaluating step, and the mean gradation evaluating step exceed respective predetermined threshold values is detected up to this point a predetermined number of times for the vehicle candidate area by the area determining means.

BRIEF DESCRIPTION OF THE DRAWINGS

The objects and features of the present invention will become more apparent from the consideration of the following detailed description taken in conjunction with the accompanying drawings in which:

FIGS. 5A to 5E are diagrams for explaining an evaluation method of the section to evaluate mean values of the degree of gradation in a lower region;

FIG. 8 is a flowchart showing operation carried out by the second embodiment.

DESCRIPTION OF THE PREFERRED EMBODIMENTS

Referring now to the accompanying drawings, description will be given of embodiments of a vehicle area detecting apparatus and a vehicle area determining method in accordance with the present invention. FIGS. 1 to 4, 5A to 5E, and 6 to 8 show the respective embodiments.

Figure 1:
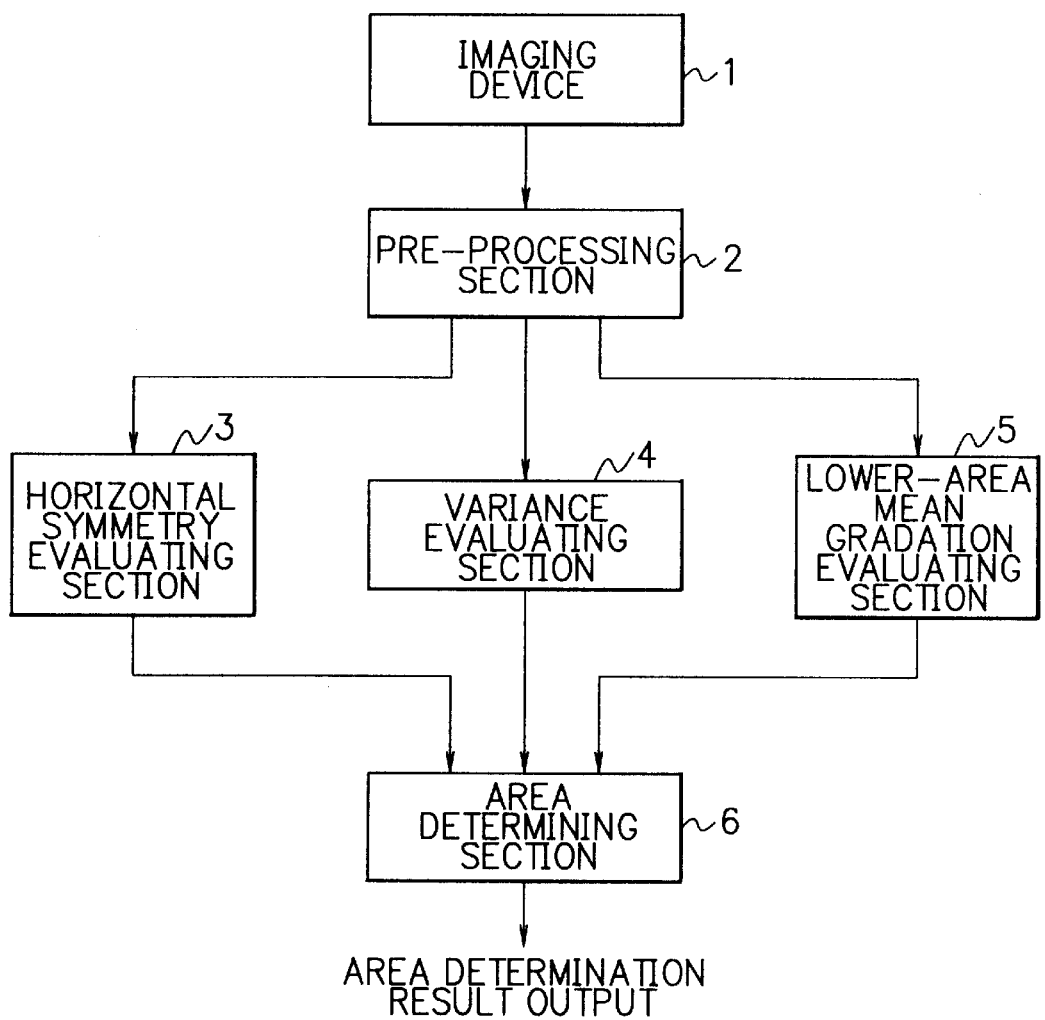
FIG. 1 is a schematic block diagram showing a configuration of a first embodiment for explaining a vehicle area detecting apparatus and a vehicle area determining method in accordance with the present invention.

FIG. 1 shows a first embodiment including an imaging device 1 such as a CCD camera installed on a vehicle, a pre-processing section 2 to execute pre-processing such as an edge detection for an image produced from the imaging device 1 so as to detect a vehicle candidate area, a horizontal symmetry (enantiomer) evaluating section 3 to evaluate a degree of horizontal symmetry of an image of the vehicle candidate area detected by pre-processing section 2, a variance evaluating section 4 to evaluate a degree of variance of an image of the vehicle candidate area detected by pre-processing section 2, a lower region mean gradation evaluating section 5 to evaluate a mean value of gradation at predetermined positions of an image of the vehicle candidate area detected by pre-processing section 2, and an area determining section 6 to determine, in accordance with results from evaluating predescribed sections 3 to 5, whether or not the image detected as the vehicle candidate area by pre-processing section 2 is a vehicle area.

In accordance with the present invention, for a vehicle in an image produced by an imaging device placed in a vehicle, an area is correctly detected for the vehicle in the image. Ordinarily, for each of the vehicle candidate areas obtained from differentiated images, i.e., edge detection images from a pre-processing step of image processing, it is necessary to conduct a check to determine whether or not a vehicle actually exists in the area to extract therefrom candidate areas having a higher probability of existence of the vehicle. Vehicle candidate areas detected in association with noise such as a distant view and the like are also required to be removed. In this connection, a vehicle area is a rectangular area in which a vehicle is detected in a front image produced by a CCD camera and a vehicle candidate area is a candidate area which passes a primary evaluation before identification of the vehicle area.

To appropriately detect a vehicle area in the vehicle candidate areas, attention has been paid to features characteristic to a vehicle area image in accordance with the present invention as follows.

Figure 2:
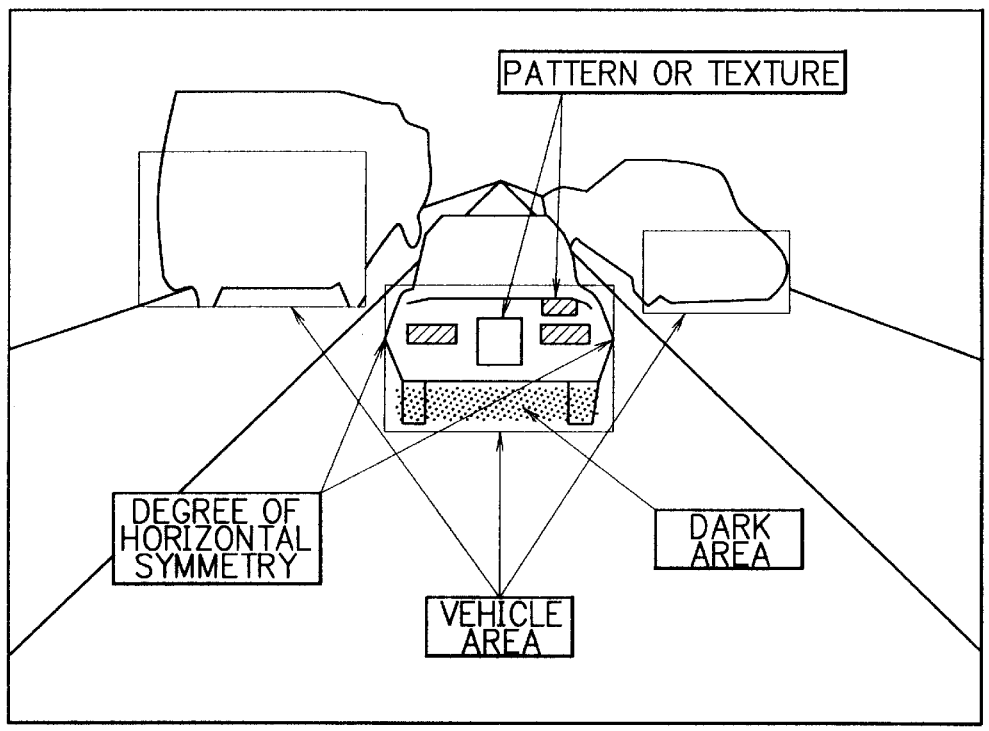
FIG. 2 is a diagram for explaining features of a vehicle area image.

An image of a vehicle produced by an imaging device installed in a vehicle behind the target vehicle includes in any case, as can be seen from FIG. 2, such items or members symmetrically placed along a horizontal line as brakelights of the vehicle. The image also includes a pattern or texture such as a number plate; moreover, a dark zone of a shade of the vehicle.

Paying attention to these features of vehicle area images, the present invention adopts, as criteria of determination for detection of a vehicle area, a degree of horizontal symmetry (enantiometric symmetry) with respect to the degree of gradation in the image of the vehicle candidate area, a degree of variance in the degree of gradation in the image of the vehicle candidate area, and a difference in the degree of gradation of an image between a lower section or area of the vehicle candidate area and an area in the proximity of the lower edge of the candidate area.

More specifically, in accordance with the present invention, the degree of horizontal symmetry with respect to the degree of gradation in the image of the vehicle candidate area is evaluated by horizontal symmetry evaluating section 2, the degree of variance in the degree of gradation in the image of the vehicle candidate area is evaluated by variance evaluating section 4, and the difference in the degree of gradation of an image between a lower section or area of the vehicle candidate area and an area in the proximity of the lower edge of the candidate area is evaluated by lower-area mean gradation evaluating section 5. Finally, the evaluated results are compared with respective threshold values by area determined section 6 to determine whether or not the pertinent vehicle candidate area is a vehicle area.

Description will now be given of evaluation methods utilized by evaluating sections 3 to 5.

Figure 3:
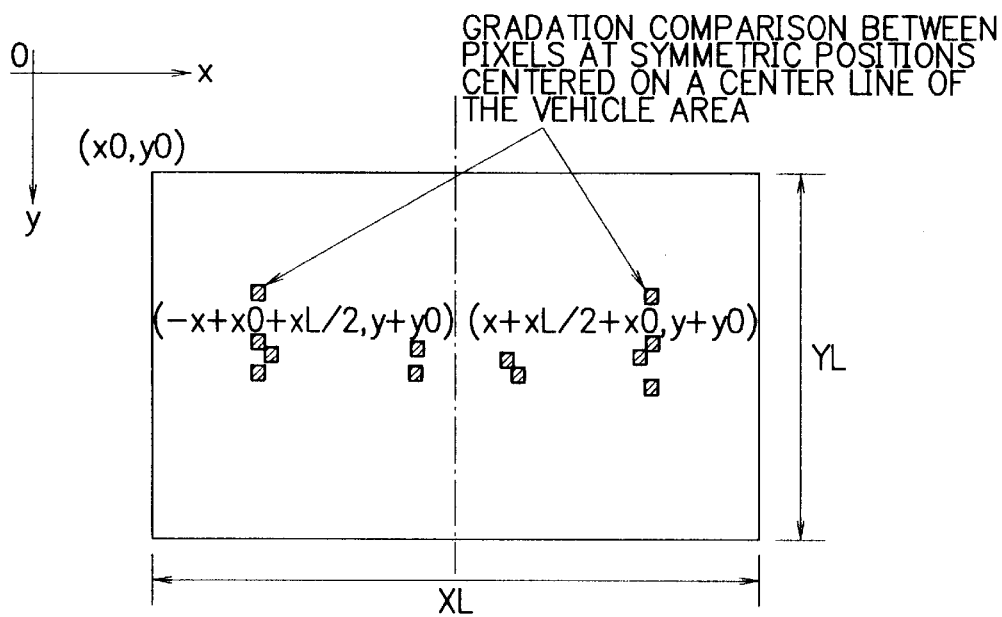
FIG. 3 is a graph for explaining an evaluation method of a section to evaluate a degree of horizontal symmetry of an image.
Figure 4:
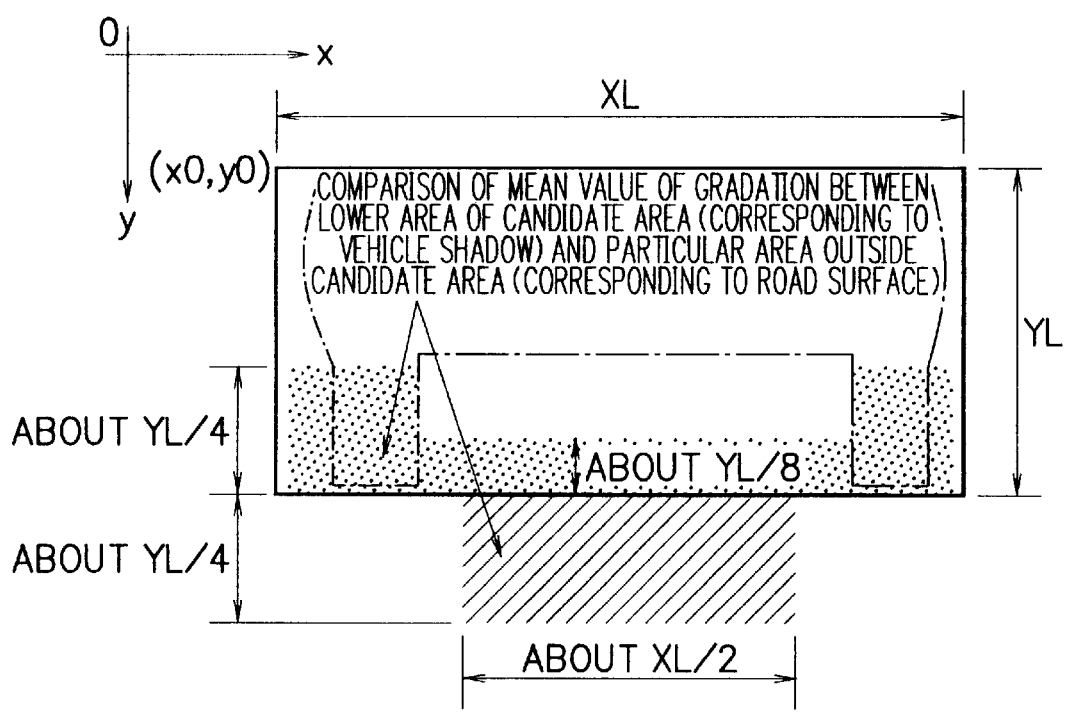
FIG. 4 is a graph for explaining an evaluation method of a section to evaluate mean values of the degree of gradation in a lower region.

Referring now to FIG. 3, description will be given of the symmetry evaluation method of horizontal symmetry evaluating section 3. A degree of horizontal symmetry of an area image set to the vehicle candidate area by pre-processing section 2 is evaluated as follows.

$$\text{Degree of horizontal symmetry} = (\Sigma |P(-x+x0+XL/2, y+y0) - P(x+x0+XL/2, y+y0)|)/(XL/2 \times YL)$$

where, $P(x,y)$ indicates a value of gradation of each pixel in the vehicle candidate area and it is assumed that $0 \leq x \leq XL/2$ and $0 \leq y \leq YL$. In addition, $(x0, y0)$ indicates a pair of upper-left coordinates of a vehicle candidate area when an upper-left point is assumed as the origin of the coordinate system of the overall image.

The evaluating expression provides an absolute value of the difference in terms of gradation between the symmetric pixels placed at the symmetric positions centered on a center line in the vehicle candidate area as shown in FIG. 3. This operation is conducted for all pixels in the area and the obtained values are averaged to produce a degree of horizontal symmetry of the vehicle candidate area. In accordance with the expression, the symmetry is higher or stronger as the value of degree of symmetry becomes smaller (approaches zero).

Alternatively, the evaluation may be carried out as follows.

$$\text{Degree of horizontal symmetry} = \{\Sigma |P(-x+x0+XL/2, y+y0) - PLav) \times P(x+x0+XL/2, y+y0) - PRav)\} / \{(XL \times YL) \times PSL \times PSR\}\}$$

where, $P(x,y)$ indicates a value of gradation of each pixel in the vehicle candidate area, PLav is a mean value of density of a left half of the vehicle candidate area, PRav is a mean value of density of a right half of the vehicle candidate area, PSL designates a deviation value of gradation of a left half of the vehicle candidate area, PSR is a deviation value of gradation of a right half of the vehicle candidate area, and it is assumed that $0 \leq x \leq XL/2$ and $0 \leq y \leq YL$. In accordance with the expression, the symmetry is stronger as the value evaluated becomes greater.

Next, the variance evaluating method of evaluating section 4 will be described. Section 4 calculates a value of variance for the mean values of gradation in the vehicle candidate area to evaluate variance of values of gradation in the area image set to the vehicle candidate area by pre-processing section 2. The value of variance is calculated as follows.

$$\text{Variance} = \Sigma(|P(x,y) - Pav|/(XL \times YL)$$

or, $$\text{Variance} = \Sigma((P(x,y) - Pav)^2/(XL \times YL)$$

where, $P(x,y)$ indicates a value of gradation of each pixel in the vehicle candidate area, Pav designates a mean value of gradation of the overall vehicle candidate area. It is assumed that $0 \leq x \leq XL/2$ and $0 \leq y \leq YL$. In accordance with the expression, the variance is greater as the value attained becomes increased.

Description will be given of the evaluation method of evaluating section 5 to achieve a gradation comparison between an image of a lower area of the vehicle candidate area and an image of an area in the proximity of a lower edge of the candidate area.

Section 5 calculates mean values of gradation respectively of the image of the lower area and that of a particular area in the proximity of the lower edge of the candidate area to obtain a difference between the mean values of gradation. As can be seen from FIG. 4, the lower area includes right and left edge areas related to tires of the vehicle in the lower section of the vehicle candidate area and a central lower area corresponding to a shadow of the vehicle between the tires in the vehicle candidate area. The area related to the tires has a height of about YL/4 in the y-axis direction relative to the lower end of the vehicle candidate area, and the area associated with the vehicle shadow has a height of about YL/8 in the y-axis direction relative to the lower end of the vehicle candidate area. The particular area in the neighborhood of the lower end of the vehicle candidate area is a rectangular area in the proximity of the central part of the lower edge of the vehicle candidate area, the particular area has a length of about XL/2 in the x-axis direction and a width of about YL/4 in the y-axis direction.

It is to be understood that the lower area and the area in the proximity of the lower edge of the candidate area are not restricted by the example prescribed above. For example, the lower area may be, as shown in FIG. 5A, an area having a height of about YL/4 in the y-axis direction relative to the lower end of the candidate area and a fixed width almost equal to the width of the candidate area in the x-axis direction or may be, as shown in FIG. 5B, areas each having a width of about XL/4 in the x-axis direction respectively associated with the tire shadow areas so as to use a mean value of gradation of both areas on the left-hand and right-hand sides of the lower area. The area in the vicinity of the lower edge of the candidate area may be, as shown in FIG. 5C, an area having a width substantially equal to that of the candidate area in the x-axis direction and a length of about YL/4 in the y-axis direction; may include areas respectively associated with the tires as shown in FIG. 5D; or may be areas in which areas having a height almost equal to that of the tires in the proximity respectively of the edges of the lower edge area are added to the associated areas of FIG. 5D. For the separate areas, a mean value of gradation need only be calculated.

Although evaluating section 5 calculates the mean values of gradation respectively of the images of the lower area and the area near the lower edge of the candidate area to compare the calculated values with each other, it may also be possible to extract, after the calculation of the mean values, a maximum, a minimum, or an intermediate value of each of the images in the respective area to thereafter compare the extracted values with each other.

Figure 6:
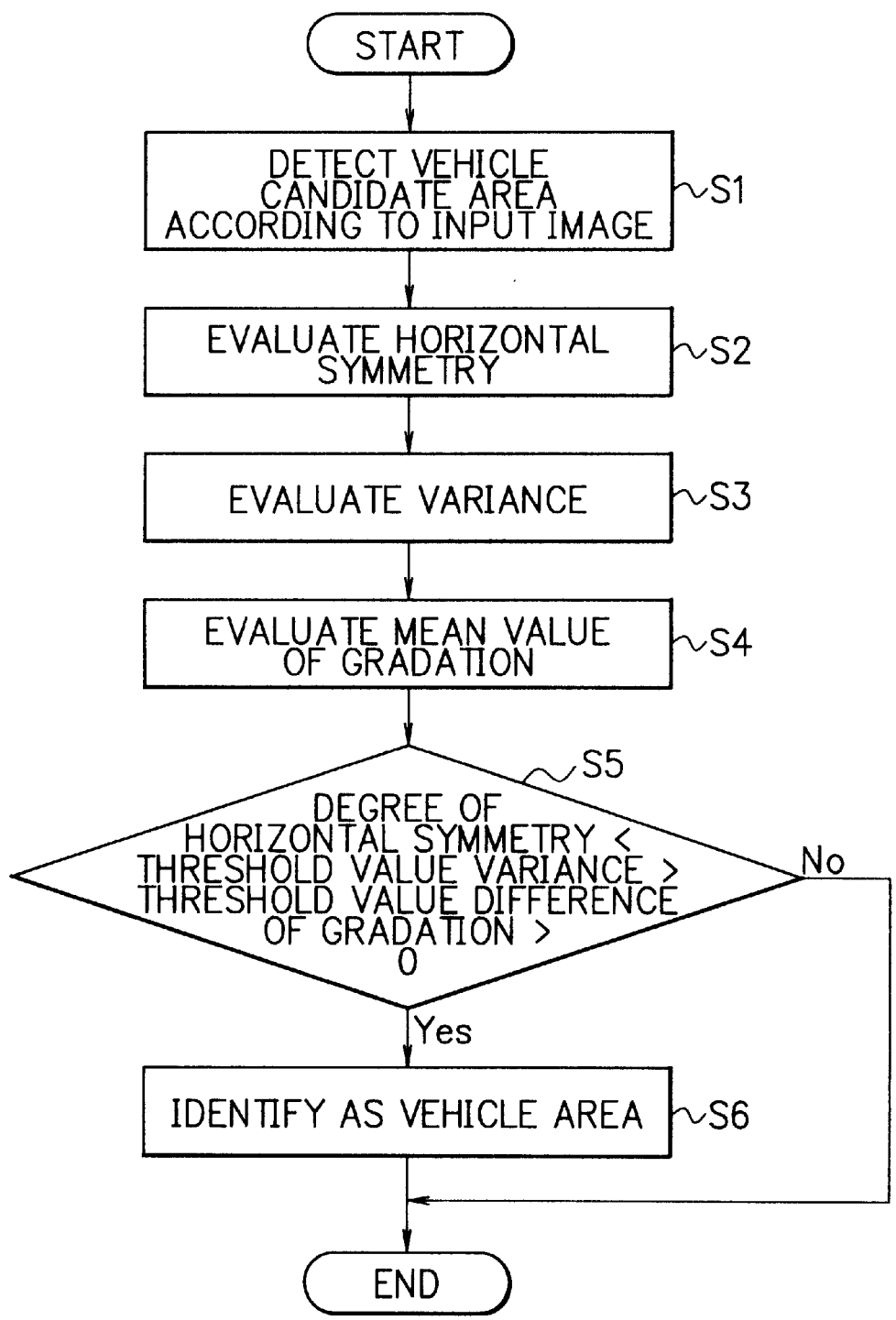
FIG. 6 is a flowchart showing operation of the first embodiment.

Referring now to the flowchart of FIG. 6, description will be given of a sequence of processing steps of the first embodiment. In step S1, an image in front of the vehicle is produced by imaging device 1 and the image is processed by pre-processing section 2 to produce a differentiated image, i.e., an edge detection image to thereby detect an area including many horizontal and vertical edges. The area is sent as a vehicle candidate area from pre-processing section 2 to evaluating sections 3 to 5.

In step S2, the image of the candidate area from section 2 is evaluated for a degree of horizontal symmetry by symmetry evaluating section 3. Specifically, an absolute value of the difference in gradation is obtained for each pair of pixels placed at symmetric positions centered on a central line in a vertical direction of the candidate area. This operation is carried out for all pixels in the candidate area to obtain a mean value thereof as a degree of horizontal symmetry of the area. The resultant value is fed to area determining section 6.

In step S3, a value of variance is evaluated by variance evaluating section 4 for the values of gradation of the candidate area from pre-processing section 2. Namely, the value of variance is calculated for the mean values of gradation of the image in the candidate area. The attained variance is sent to area determining section 6.

In step S4, a difference is calculated by gradation evaluating section 5 for the mean value of gradation of the lower area of the candidate area and the particular area in the proximity of the lower edge of the candidate area to thereby achieve the gradation comparison. The difference calculated is sent to area determining section 6.

In step S5, the degree of symmetry, the variance, and the difference respectively from evaluating sections 3 to 5 are compared by area determining section 6 with respective predetermined threshold values. If the degree of symmetry is less than the threshold value, the variance is larger than the threshold value, and the difference is more than zero (step S5 becomes "yes"), the candidate area detected by pre-processing section 2 is identified as a vehicle area (step S6). If either one of the conditions above is not satisfied, the candidate area is not identified as a vehicle area by area determining section 6.

In the embodiment, a vehicle area can be appropriately determined for the vehicle candidate area with a high value of probability of existence of a vehicle in an image from an imaging device in accordance with the degree of horizontal symmetry with respect to the degree of gradation in the image of the vehicle candidate area evaluated by the horizontal symmetry evaluating section 3, the degree of variance in the degree of gradation in the image of the vehicle candidate area evaluated by the variance evaluating section 4, and the difference in the degree of gradation of an image between a lower area of the vehicle candidate area and an area in the proximity of the lower edge of the candidate area evaluated by the lower-area mean gradation evaluating section 5.

The embodiment is independent of the templates conventionally used to detect a vehicle area and hence is independent of the contour of the items to be detected. Even if the detected image varies depending on weather and/or due to an environmental difference between day and night, the vehicle area can be detected by relative accuracy.

Since the gradation of the image in an area in the proximity of the lower edge of the vehicle candidate area is compared with that of the image in the lower area of the vehicle candidate area, the reference gradation is little varied and hence the vehicle area can be correctly identified.

The operation by the horizontal symmetry evaluating section 2 to evaluate the degree of horizontal symmetry with respect to the degree of gradation in the image of the vehicle candidate area, the evaluation by the variance evaluating section 4 for the degree of variance in the degree of gradation in the image of the vehicle candidate area, and the operation by the lower-area mean gradation evaluating section 5 to evaluate the difference in the degree of gradation of an image between a lower area of the vehicle candidate area and an area in the proximity of the lower edge of the candidate area can be achieved through relatively simple processing with a small amount of calculation steps. This consequently leads to minimization of the time required to detect the vehicle area.

Figure 7:
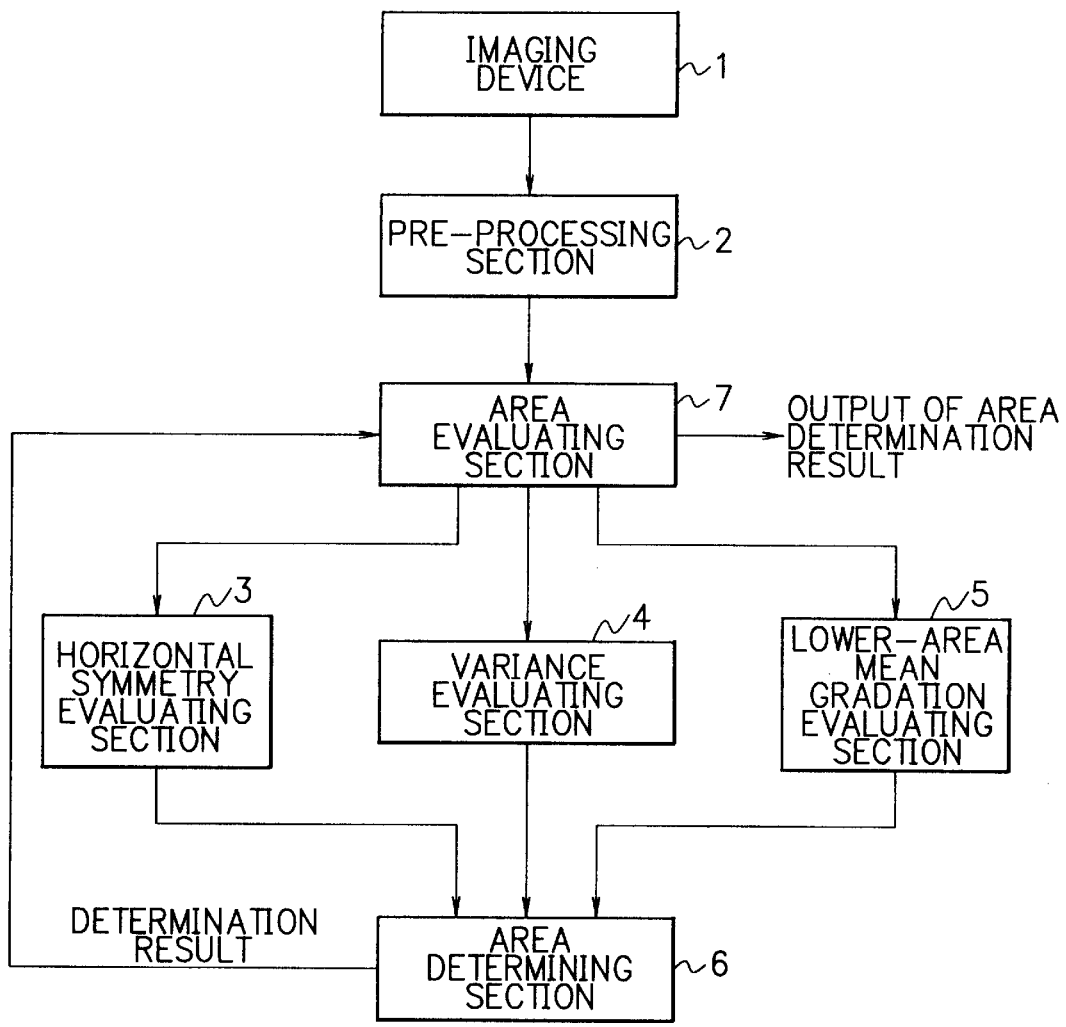
FIG. 7 is a block diagram showing structure of a second embodiment for explaining a vehicle area detecting apparatus and a vehicle area determining method in accordance with the present invention.

Referring next to FIG. 7, description will be given of structure of a second embodiment in accordance with the present invention. The second embodiment of FIG. 7 includes an area evaluating section 7 in addition to the constituent components of the first embodiment. Area determining section 6 compares the degree of symmetry, the variance, and the difference with the respective predetermined values which is sent by evaluate sections 3 to 5 respectively, and sends, when the predetermined conditions are satisfied as a result of comparison, positional information of the vehicle candidate area evaluated to area evaluating section 7. Section 7 adds one to a value of an area counter for an area substantially at the same position as that of the vehicle candidate area notified from area determining section 6. In the second embodiment, when new information of a vehicle candidate area is received via pre-processing section 2 from imaging device 1, area evaluating section 7 makes a check to determine whether or not the value of the area counter for the position almost equal to that of the candidate area exceeds a predetermined threshold value. If the counter value is greater, section 7 detects the pertinent candidate area as a vehicle area.

In accordance with the second embodiment, a vehicle candidate area for which the evaluation results of evaluating sections 3 to 5 repeatedly satisfy the respective conditions for a predetermined number of times is assumed as a vehicle area. Consequently, the vehicle area can be detected with a higher probability.

Referring next to the flowchart of FIG. 8, description will be given of a sequence of processing steps of the second embodiment. In step S10, any area counter which is disposed in area evaluating section 7 and which is not operated for a predetermined period of time is cleared to zero.

In step S11, an image in front of the vehicle produced from imaging device 1 is processed by pre-processing section 2 to attain a differentiated image or an edge detection image to detect an area including many horizontal and vertical edges. The area is delivered as a vehicle candidate area to area evaluating section 7.

Section 7 includes an area counter for each area such that one is added to a value of a counter for an area at a position substantially identical to that of an area recognized as a vehicle (candidate) area by area determining section 6. When new information of a vehicle candidate area is received from pre-processing section 2, a check is made to determine whether or not the value of the area counter for an area at a position substantially equal to that of the candidate area exceeds a predetermined threshold value. If the counter value is greater (step S12 becomes "yes"), the pertinent candidate area is recognized as a vehicle area and a result of area determination is produced. If the counter value is equal to or less than the threshold value (step S12 becomes "no"), information of the vehicle candidate area is sent to evaluating sections 3 to 5.

In step S13, the image of the candidate area from section 7 is evaluated for a degree of horizontal symmetry by symmetry evaluating section 3. Namely, an absolute value of the difference in gradation is obtained for each pair of pixels plated at symmetric positions centered on a central line in a vertical direction of the candidate area. This operation is achieved for all pixels in the candidate area to obtain a mean value thereof as a degree of horizontal symmetry of the area. The resultant value is delivered to area determining section 6.

In step S14, a value of variance is evaluated by variance evaluating section 4 for the values of gradation of the candidate area from section 7. The value of variance is calculated using the mean values of gradation of the image in the candidate area. The obtained variance is sent to area determining section 6.

In step S15, a difference is calculated by gradation evaluating section 5 for the mean value of gradation of the lower area of the candidate area from section 7 and the particular area in the proximity of the lower edge of the candidate area to thereby conduct the gradation comparison. The resultant difference is fed to area determining section 6.

In step S16, the degree of symmetry, the variance, and the difference respectively from evaluating sections 3 to 5 respectively, are compared by area determining section 6 with respective predetermined threshold values. If the degree of symmetry is less than the threshold value, the variance is larger than the threshold value, and the difference is more than zero (step S16 becomes "yes"), area information of the candidate area is sent to area evaluating section 7 and one is added to a value of the area counter in section 7. If either one of the conditions above is not satisfied (step S16 becomes "no"), the candidate area is not identified as a vehicle area.

The embodiment is described as a favorable example of the present invention. However, the present invention is not restricted by the embodiment. That is, the embodiment may be changed or modified within the scope of the present invention. The vehicle candidate area is detected as a vehicle area in the embodiment when all conditions are satisfied for the degree of horizontal symmetry with respect to the degree of gradation in the image of the vehicle candidate area, the degree of variance in the degree of gradation in the image of the vehicle candidate area, and the difference in the degree of gradation of an image between a lower area of the vehicle candidate area and an area in the proximity of the lower edge of the candidate area. However, it may also be possible that the vehicle candidate area is detected as a vehicle area when either one or two of the conditions is or are satisfied.

As above, in accordance with the present invention, a vehicle area can be correctly determined for the vehicle candidate area having a high probability of existence of a vehicle in a produced image in accordance with the degree of horizontal symmetry with respect to the degree of gradation in the image of the vehicle candidate area, the degree of variance in the degree of gradation in the image of the vehicle candidate area, and the difference in the degree of gradation of an image between a lower area of the vehicle candidate area and an area in the proximity of the lower edge of the candidate area. Since the vehicle area is detected by evaluating only the degree of gradation in the vehicle candidate area, the amount of calculating steps can be reduced and the vehicle area can be detected in a shorter period of time as compared with the conventional technology.

In accordance with the present invention, a vehicle area can be appropriately determined for the vehicle candidate area having a high probability of existence of a vehicle in a produced image as follows. When an area at a position substantially equal to that of the vehicle area satisfies up to this point a predetermined number of times either one of the conditions of the degree of horizontal symmetry with respect to the degree of gradation in the image of the vehicle candidate area, the degree of variance in the degree of gradation in the image of the vehicle candidate area, and the difference in the degree of gradation of an image between a lower area of the vehicle candidate area and an area in the proximity of the lower edge of the candidate area, the area is recognized as the vehicle area. Since the detection of the vehicle area is achieved by evaluating only the degree of gradation in the vehicle candidate area, the quantity of calculations can be reduced and the vehicle area detecting time can be minimized as compared with the conventional methods.

The present invention is independent of the templates used in the conventional vehicle area detection and hence is independent of the contour of the items to be detected. Even if the detected images alter due to weather conditions as well as environmental conditions, e.g., an environmental difference between day and night, the vehicle area can be relatively correctly detected.

Since the degree of gradation of an image of an area in the proximity of the lower edge of the vehicle candidate area is compared with that of an image in a lower area of the vehicle candidate area, the reference degree of gradation little changes and hence the vehicle area can be correctly identified.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A vehicle area detecting apparatus, comprising:

imaging means mounted on a vehicle for producing an image of an object; and vehicle area detecting means mounted on the vehicle for detecting a vehicle area including a vehicle in the image produced by the imaging means, wherein the vehicle area detecting means detects the vehicle area when the vehicle area includes an image for which either one of the conditions of
 a degree of horizontal symmetry with respect to a degree of gradation in the image of the area,
 a degree of variance in the degree of gradation in the image of the area, and
 a difference in the degree of gradation of an image between a lower area of a vehicle candidate area and an area in the proximity of a lower edge of the candidate area exceeds a predetermined threshold value.

2. A vehicle area detecting apparatus, comprising:

imaging means mounted on a vehicle for producing an image of an object; and vehicle area detecting means mounted on the vehicle for detecting a vehicle area including a vehicle in the image produced by the imaging means, wherein the vehicle area detecting means detects the vehicle area when the vehicle area includes an image for which two of the conditions of
 a degree of horizontal symmetry with respect to a degree of gradation in the image of the area,
 a degree of variance in the degree of gradation in the image of the area, and
 a difference in the degree of gradation of an image between a lower area of a vehicle candidate area and an area in the proximity of a lower edge of the candidate area exceed respective predetermined threshold values.

3. A vehicle area detecting apparatus, comprising:

imaging means mounted on a vehicle for producing an image of an object; and vehicle area detecting means mounted on the vehicle for detecting a vehicle area including a vehicle in the image produced by the imaging means, wherein the vehicle area detecting means detects the vehicle area when the vehicle area includes an image for which
 a degree of horizontal symmetry with respect to a degree of gradation in the image of the area is larger than a predetermined threshold value,
 a degree of variance in the degree of gradation in the image of the area is larger than a predetermined threshold value, and
 a difference in the degree of gradation of an image between a lower area of a vehicle candidate area and an area in the proximity of a lower edge of the candidate area is larger than a predetermined threshold value.

4. A vehicle area detecting apparatus, comprising:

imaging means mounted on a vehicle for producing an image of an object; and vehicle area detecting means mounted on the vehicle for detecting a vehicle area including a vehicle in the image produced by the imaging means, wherein the vehicle area detecting means detects the vehicle area as an area at a position substantially equal to that of the vehicle area when the area satisfies up to this point a predetermined number of times either one of
 a condition for a degree of horizontal symmetry with respect to a degree of gradation in the image of the area,
 a condition for a degree of variance in the degree of gradation in the image of the area, and
 a condition for a difference in the degree of gradation of an image between a lower area of a vehicle candidate area and an area in the proximity of a lower edge of the candidate area.

5. A vehicle area detecting apparatus, comprising:

imaging means mounted on a vehicle for producing an image of an object; and vehicle area detecting means mounted on the vehicle for detecting a vehicle area including a vehicle in the image produced by the imaging means, wherein the vehicle area detecting means detects the vehicle area as an area at a position substantially equal to that of the vehicle area when the area satisfies up to this point a predetermined number of times two of the conditions for
 a degree of horizontal symmetry with respect to a degree of gradation in the image of the area,
 a degree of variance in the degree of gradation in the image of the area, and
 a difference in the degree of gradation of an image between a lower area of a vehicle candidate area and an area in the proximity of a lower edge of the candidate area.

6. A vehicle area detecting apparatus, comprising:

imaging means mounted on a vehicle for producing an image of an object; and vehicle area detecting means mounted on the vehicle for detecting a vehicle area including a vehicle in the image produced by the imaging means, wherein the vehicle area detecting means detects the vehicle area as an area at a position substantially equal to that of the vehicle area when the area satisfies up to this point a predetermined number of times the conditions for
 a degree of horizontal symmetry with respect to a degree of gradation in the image of the area, a degree of variance in the degree of gradation in the image of the area, and a difference in the degree of gradation of an image between a lower area of a vehicle candidate area and an area in the proximity of a lower edge of the candidate area.

7. A vehicle area detecting apparatus for detecting a vehicle area in a vehicle candidate area having a high probability of existence of a vehicle in an image produced by imaging means mounted on a vehicle, comprising:

horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area; and area determining means for determining a vehicle candidate area as the vehicle area when either one of results of evaluation from the symmetry evaluating means, the variance evaluating means, and the mean gradation evaluating means exceeds a predetermined threshold value.

8. A vehicle area detecting apparatus for detecting a vehicle area in a vehicle candidate area having a probability of existence of a vehicle in an image produced by imaging means mounted on a vehicle, comprising:

horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area; and area determining means for determining a vehicle candidate area as the vehicle area when two of the results of evaluation from the symmetry evaluating means, the variance evaluating means, and the mean gradation evaluating means exceed respective predetermined threshold values.

9. A vehicle area detecting apparatus for detecting a vehicle area in a vehicle candidate area having a probability of existence of a vehicle in an image produced by imaging means mounted on a vehicle, comprising:

horizontal symmetry evaluating means for evaluating a degree of horizontal symmetry with respect to a degree of gradation in the image of the area, variance evaluating means for evaluating a degree of variance in the degree of gradation in the image of the area, mean gradation evaluating means for evaluating a difference in the degree of gradation of an image between a lower area of a vehicle candidate area and an area in the proximity of a lower edge of the candidate area; and area determining means for determining a vehicle candidate area as the vehicle area when the results of evaluation from the symmetry evaluating means, the variance evaluating means, and the mean gradation evaluating means exceed respective predetermined threshold values.

* * * * *